United States Patent
Sikka et al.

(10) Patent No.: US 12,423,295 B2
(45) Date of Patent: Sep. 23, 2025

(54) TEXT TO QUESTION-ANSWER MODEL SYSTEM

(71) Applicant: VIANAI SYSTEMS, INC., Palo Alto, CA (US)

(72) Inventors: Vishal Inder Sikka, Los Altos Hills, CA (US); Walid Rahman, New York, NY (US); Kevin Frederick Dunnell, Waltham, MA (US)

(73) Assignee: VIANAI SYSTEMS, INC., Palo Alto, CA (US)

( * ) Notice: Subject to any disclaimer, the term of this patent is extended or adjusted under 35 U.S.C. 154(b) by 431 days.

(21) Appl. No.: 17/222,346

(22) Filed: Apr. 5, 2021

(65) Prior Publication Data
US 2022/0318230 A1  Oct. 6, 2022

(51) Int. Cl.
| | |
|---|---|
| *G06F 16/23* | (2019.01) |
| *G06F 40/166* | (2020.01) |
| *G06F 40/30* | (2020.01) |
| *G06N 20/00* | (2019.01) |
| *G06Q 30/0201* | (2023.01) |

(52) U.S. Cl.
CPC ........ *G06F 16/2379* (2019.01); *G06F 40/166* (2020.01); *G06F 40/30* (2020.01); *G06N 20/00* (2019.01); *G06Q 30/0201* (2013.01)

(58) Field of Classification Search
None
See application file for complete search history.

(56) References Cited

U.S. PATENT DOCUMENTS

| | | | |
|---|---|---|---|
| 9,384,450 B1* | 7/2016 | Cordes | G06N 20/00 |
| 2007/0067293 A1* | 3/2007 | Yu | G06F 16/3346 |
| 2015/0026106 A1 | 1/2015 | Oh et al. | |
| 2015/0193429 A1* | 7/2015 | Bohra | G06F 16/3329 704/9 |
| 2016/0117314 A1* | 4/2016 | Kantor | G06F 40/205 704/9 |
| 2017/0032689 A1* | 2/2017 | Beason | G09B 7/00 |
| 2017/0351962 A1* | 12/2017 | Appel | G06N 7/01 |
| 2019/0188326 A1* | 6/2019 | Daianu | G06F 16/90332 |
| 2021/0334664 A1* | 10/2021 | Li | G06V 30/413 |
| 2021/0390418 A1* | 12/2021 | Mass | G06N 3/08 |
| 2021/0406479 A1* | 12/2021 | Werner | G06N 3/084 |

OTHER PUBLICATIONS

International Search Report for Application No. PCT/US2022/021694 dated Jun. 24, 2022.
Lita et al., "Instance-Based Question Answering", Thesis Committee, https://apps.dtic.mil/dtic/tr/fulltext/u2/a462538.pdf, Dec. 1, 2006, 232 pages.

* cited by examiner

*Primary Examiner* — Tuan S Nguyen
(74) *Attorney, Agent, or Firm* — Artegis Law Group, LLP (57) ABSTRACT

Various embodiments set forth systems and techniques for generating domain-specific question answering models. The techniques include receiving a set of input text corresponding to a particular domain; generating, based on the set of input text, a question-answer dataset corresponding to the particular domain, the question-answer dataset comprising a plurality of question-answer pairs; and causing one or more machine learning algorithms to be applied to the question-answer dataset to generate a question answering model associated with the particular domain.

18 Claims, 4 Drawing Sheets

TEXT TO QUESTION-ANSWER MODEL SYSTEM

BACKGROUND

Field of the Various Embodiments

Embodiments of the present disclosure relate generally to machine learning, and more specifically, to a text to question-answer model system.

Description of the Related Art

Machine learning may be used to discover trends, patterns, relationships, and/or other attributes related to large sets of complex, interconnected, and/or multidimensional data. To glean insights from large data sets, regression models, artificial neural networks, support vector machines, decision trees, naïve Bayes classifiers, and/or other types of machine learning models may be trained using input-output pairs in the data. In turn, the discovered information may be used to guide decisions and/or perform actions related to the data.

Machine learning may be used in natural language processing (NLP) and natural language understanding (NLU) contexts for creating language models. Language models can be trained to process and analyze natural language data. One use of language models is reading comprehension and question answering. For example, a language model may be trained to take a piece of text and a question regarding that text, and answer the question based on the text. This question answering model is typically trained using a dataset derived from general or common texts, such as articles, which cover many different topics. Training a question answering model using a broad dataset allows the trained question answering model to answer questions for a wide variety of input texts.

One drawback of this approach is that the question answering model is trained to process input texts that are similar to the texts used to train the question answering model. The general or common texts in the training dataset may include very few texts from specialized or technical domains, such as law or medicine. Furthermore, texts from specialized or technical domains frequently use language styles that differ from common texts. Thus, when input texts and questions from these domains are provided to the question answering model, the question answering model is unable to accurately answer the provided questions. However, little or no datasets exist that include only texts from a specific domain, and such datasets may also not include enough text to train a question answering model.

As the foregoing illustrates, what is needed in the art are more effective techniques for generating question answering models for specific domains.

SUMMARY

Various embodiments include a computer-implemented method for generating domain-specific question answering models, including receiving a set of input text corresponding to a particular domain; generating, based on the set of input text, a question-answer dataset corresponding to the particular domain, the question-answer dataset comprising a plurality of question-answer pairs; and causing one or more machine learning algorithms to be applied to the question-answer dataset to generate a question answering model associated with the particular domain.

At least one technical advantage of the disclosed techniques relative to the prior art is that the disclosed computing system processes texts from a specific domain to generate a domain-specific question-answer dataset. The domain-specific question-answer dataset enables generation of a domain-specific question answering model. The domain-specific question answering model more accurately answers questions based on texts from the specific domain compared to general-purpose question answering models. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1:
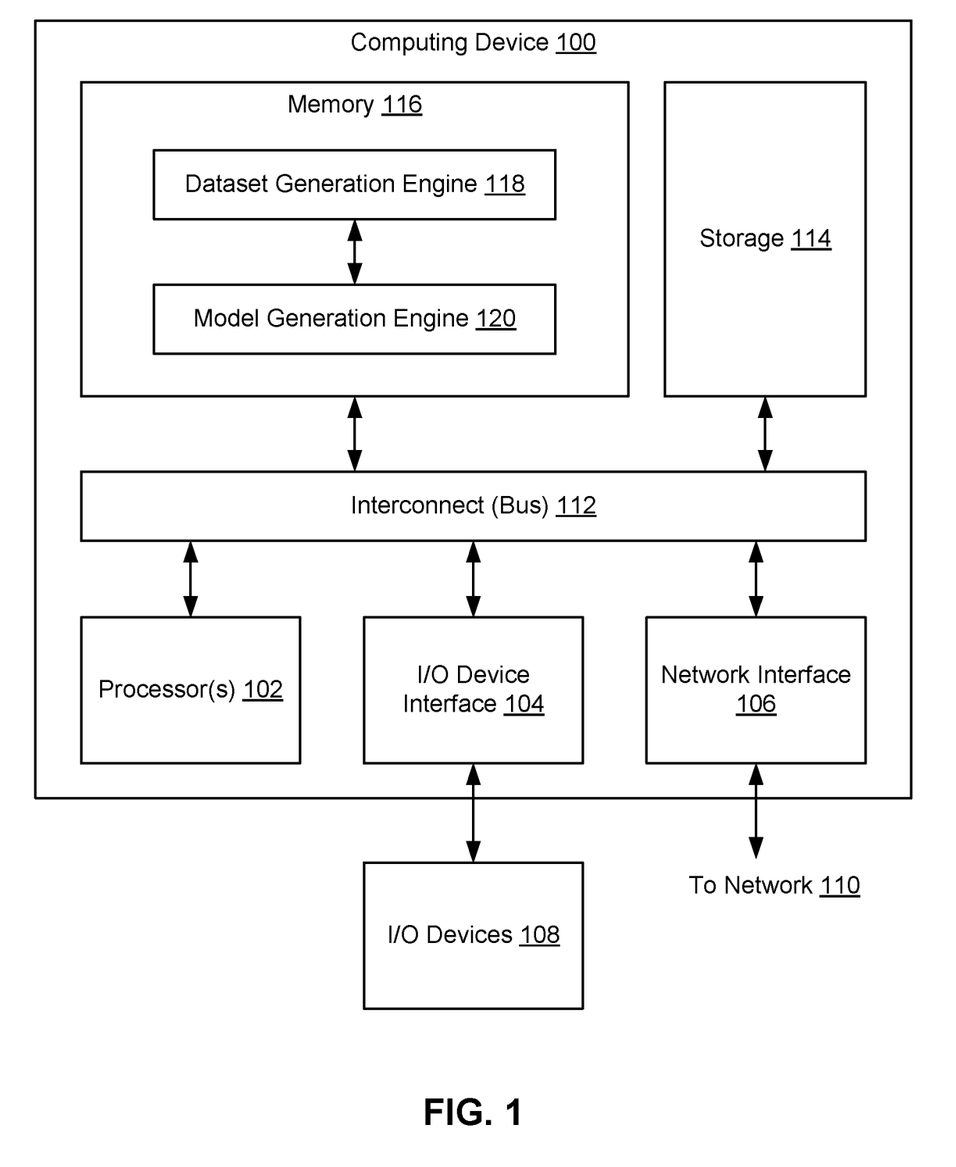
FIG. 1 is a schematic diagram illustrating a computing system configured to implement one or more aspects of the present disclosure.

FIG. 1 illustrates a computing device 100 configured to implement one or more aspects of the present disclosure. As shown, computing device 100 includes an interconnect (bus) 112 that connects one or more processing units 102, an input/output (I/O) device interface 104 coupled to one or more input/output (I/O) devices 108, memory 116, a storage 114, and a network interface 106.

Computing device 100 includes a desktop computer, a laptop computer, a smart phone, a personal digital assistant (PDA), tablet computer, or any other type of computing device configured to receive input, process data, and optionally display images, and is suitable for practicing one or more embodiments. Computing device 100 described herein is illustrative and that any other technically feasible configurations fall within the scope of the present disclosure.

Processing unit(s) 102 includes any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processing unit(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing embodiment executing within a computing cloud.

In one embodiment, I/O devices 108 include devices capable of providing input, such as a keyboard, a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user of computing device 100, and to also provide various types of output to the end-user of computing device 100, such as displayed digital images or digital videos or text. In some embodiments, one or more of I/O devices 108 are configured to couple computing device 100 to a network 110.

Network 110 includes any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

Storage 114 includes non-volatile storage for applications and data, and may include fixed or removable disk drives, flash memory devices, and CD-ROM, DVD-ROM, Blu-Ray, HD-DVD, or other magnetic, optical, or solid state storage devices. Dataset generation engine 118 and model generation engine 120 may be stored in storage 114 and loaded into memory 116 when executed.

Memory 116 includes a random access memory (RAM) module, a flash memory unit, or any other type of memory unit or combination thereof. Processing unit(s) 102, I/O device interface 104, and network interface 106 are configured to read data from and write data to memory 116. Memory 116 includes various software programs that can be executed by processor(s) 102 and application data associated with said software programs, including dataset generation engine 118 and model generation engine 120. Dataset generation engine 118 and model generation engine 120 are described in further detail below with respect to FIG. 2. Although dataset generation engine 118 and model generation engine 120 are described herein in connection with the same computing device 100, in various embodiments, dataset generation engine 118 and model generation engine 120 may reside on different computing devices and/or may operate at different points in time from one another.

Figure 2:
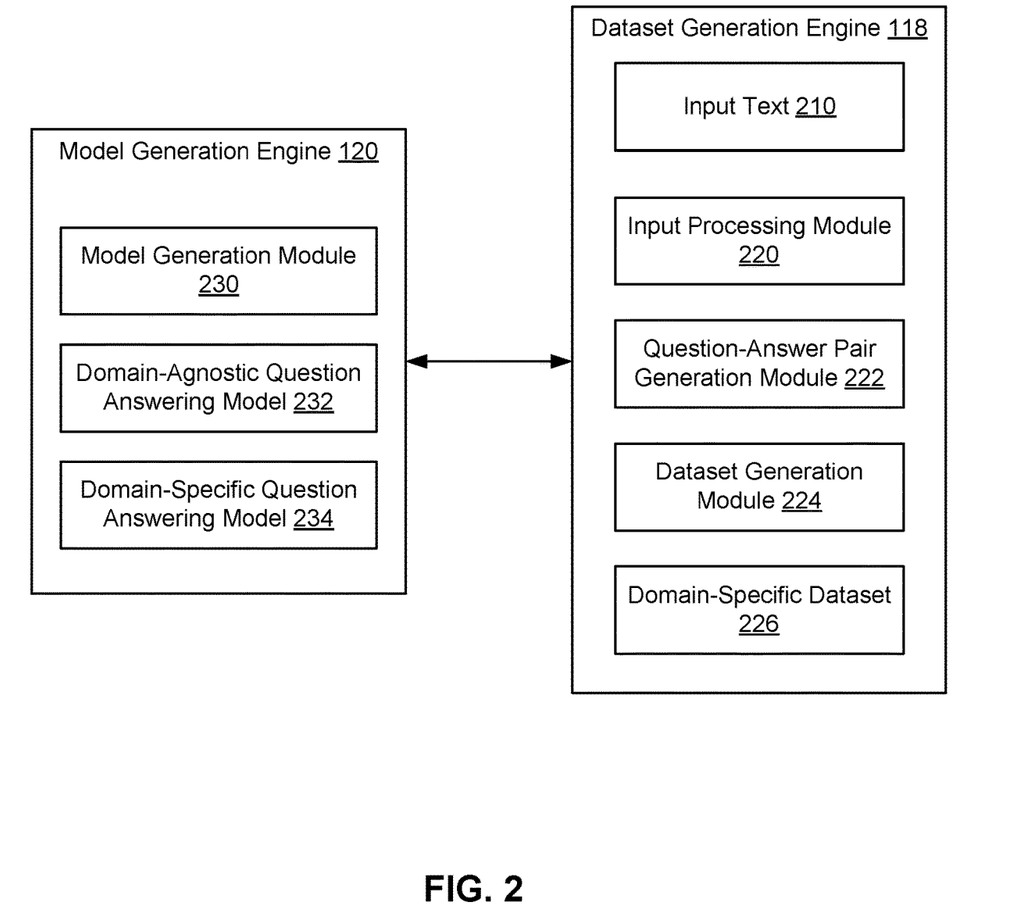
FIG. 2 is a more detailed illustration of the dataset generation engine and model generation engine of FIG. 1, according to various embodiments of the present disclosure.

FIG. 2 is a more detailed illustration of dataset generation engine 118 and model generation engine 120 of FIG. 1, according to various embodiments of the present disclosure. As shown, dataset generation engine 118 includes, without limitation, input processing module 220, question-answer pair generation module 222, dataset generation module 224, and domain-specific dataset 226.

Dataset generation engine 118 automatically generates a domain-specific dataset from a set of domain-specific input text. A domain may be an area of knowledge, expertise, activity, field of study, or other application. Example domains may include legal, scientific, technological, and academic fields and/or specialties within those fields. The domain-specific dataset is a question-answer dataset that can be used to train and/or fine-tune a question answering model that can answer questions related to the specific domain. Additionally, in some embodiments, dataset generation engine 118 includes tools and/or features, such as a graphical user interface, that allow a user to provide input text and/or select input text for processing.

Input text 210 may be, for example and without limitation, one or more documents or portions thereof, such as articles, journals, white papers, web pages, user-generated or user-provided text, and other texts that are related to a specific domain. Dataset generation engine 118 receives input text 210 from, for example, a database or other data storage system, another computer system or computing device, from user input such as via a graphical user interface, or other sources of input text. In some embodiments, a user specifies one or more data sources for retrieving input text 210. In some embodiments, a user specifies a specific domain, and, based on the specified domain, dataset generation engine 118 identifies one or more data sources corresponding to the specified domain. Dataset generation engine 118 retrieves input text 210 from the one or more identified data sources. As an example, a user may specify a particular scientific field as the domain. Dataset generation engine 118 identifies and retrieves white papers, scientific journals, scholastic articles, and other texts associated with the particular scientific field.

In operation, input processing module 220 receives input text 210, processes the input text 210, and provides the processed input text to question-answer pair generation module 222. In some embodiments, input processing module 220 processes the input text 210 by removing unwanted or extraneous characters, phrases, symbols, non-text data, and/or formatting. In some embodiments, a user specifies one or more particular text elements to remove via, for example, a graphical user interface or configuration data. In some embodiments, input text 210 comprises one or more documents or other files, and input processing module 220 processes the input text 210 by extracting text contained in the one or more documents or other files.

In some embodiments, input processing module 220 processes the input text 210 by generating a plurality of text segments based on the input text 210. Each text segment comprises a portion of the input text 210. In some embodiments, input processing module 220 generates the plurality of text segments based on processed input text, such as extracted text or text with unwanted text elements removed.

In some embodiments, generating the plurality of text segments comprises dividing input text 210 into a plurality of non-overlapping segments. Each segment includes a different set of tokens and/or sentences from input text 210. In some embodiments, generating the plurality of text segments comprises dividing input text 210 into a plurality of overlapping segments. Each segment includes at least one of the same tokens and/or sentences from the input text 210 as one or more other segments.

In some embodiments, input processing module 220 divides input text 210 into segments of equal size. The segment size may be based on an optimal segment size that question-answer pair generation module 222 is configured to utilize. For example, question-answer pair generation module 222 is configured to produce more accurate results when provided text with a size of 512 tokens or less, so input processing module 220 divides input text 210 into segments that are each 512 tokens long.

In some embodiments, input processing module 220 determines a size of each segment based on the content of the segment. Input processing module 220 selects a size for each segment such that each segment includes sufficient context surrounding the text included in the segment, such as including entire phrases, sentences, paragraphs, and/or other sets of related text together in the same segment. For example, if a portion of input text 210 comprises long sentences, then input processing module 220 selects a segment size that is large enough to include one or more of the long sentences in each segment generated from the portion of input text 210. If a portion of input text 210 comprises short sentences or bullet points, then input processing module 220 selects a smaller segment size for segments generated based on the portion of input text 210, since a segment with the smaller segment size can still include one or more short sentences or a bullet point.

Input processing module 220 provides the processed text to question-answer pair generation module 222. In some embodiments, input processing module 220 provides the plurality of text segments to question-answer pair generation module 222.

Question-answer pair generation module 222 receives the processed input text and/or input text 210 and generates a plurality of question-answer pairs based on the processed input text and/or input text 210. In some embodiments, the processed input text comprises a plurality of text segments. Question-answer pair generation module 222 generates, for each text segment, a plurality of question-answer pairs based on the text segment.

In some embodiments, each question-answer pair comprises a question based on the processed input text and an answer, from the processed input text, corresponding to the question. In some embodiments, question-answer pair generation module 222 generates one or more questions that do not have an answer in the processed input text. The question-answer pairs corresponding to the one or more questions includes data indicating that no answer to the question is in the processed input text, rather than including a corresponding answer.

In some embodiments, question-answer pair generation module 222 generates the plurality of question-answer pairs by generating a plurality of answers based on the processed input text and/or input text 210. For example, question-answer pair generation module 222 analyzes the processed input text to determine portions of the processed input text that may be an answer to a question. For each answer of the plurality of answers, question-answer pair generation module 222 generates, based on the answer, one or more corresponding questions that could be answered by the answer. In some embodiments, generating the one or more corresponding questions is further based on the processed input text and/or input text 210 from which the answer is generated.

In some embodiments, question-answer pair generation module 222 comprises one or more machine learning models. Each machine learning model of the one or more machine learning models may be any technically feasible machine learning model that includes functionality for natural language processing, such as an artificial neural network. In some embodiments, the one or more machine learning models include one or more transformer machine learning models. In some embodiments, question-answer pair generation module 222 includes one or more machine learning models trained to receive a text segment as input and generate a set of answers based on the text segment. In some embodiments, question-answer pair generation module 222 includes one or more machine learning models trained to receive an answer as input and generate one or more questions corresponding to the answer.

Dataset generation module 224 processes the question-answer pairs to generate a domain-specific dataset 226. Domain-specific dataset 226 is a question-answer dataset that can be used to train and/or fine-tune a question answering model that can answer questions related to the specific domain.

In some embodiments, the domain-specific dataset 226 comprises the plurality of question-answer pairs, and for each question-answer pair, an index corresponding to the answer in the question-answer pair. The index indicates a location within the processed input text and/or the input text 210 at which the corresponding answer is located. In some embodiments, dataset generation module 224 processes the question-answer pairs by determining, for each question-answer pair, the index corresponding to the answer in the question-answer pair. In some embodiments, question-answer pair generation module 222 generates indices corresponding to the plurality of answers when generating the plurality of answers and include the indices in the plurality of question-answer pairs.

Additionally, in some embodiments, the domain-specific dataset 226 comprises context data associated with the answer in the question-answer pair. In some embodiments, context data associated with an answer comprises portions of the processed input text and/or the input text 210 surrounding the answer. In some embodiments, the processed input text comprises a plurality of text segments, and the context data associated with an answer comprises the particular text segment in which the answer is located.

The domain-specific dataset is provided to model generation engine 120 for generating a domain-specific question answering model. As shown, model generation engine 120 includes, without limitation, model generation module 230, domain-agnostic question answering model 232, and domain-specific question answering model 234. In general, domain-agnostic question answering model 232 and domain-specific question answering model 234 may be any suitable machine learning model for performing natural language processing. In some embodiments, domain-agnostic question answering model 232 and/or domain-specific question answering model 234 are transformer-based machine learning models.

Domain-agnostic question answering model 232 is a question answering model that is trained using a domain-agnostic dataset. In some embodiments, domain-agnostic question answering model 232 is trained to receive a set of text and a question as input, and generate output indicating a location within the set of text of an answer to the question. In some embodiments, domain-agnostic question answering model 232 is trained to receive a set of text and a question as input, and generate output indicating an answer to the question. The domain-agnostic dataset may be any generally available question-answer dataset, and typically includes general-knowledge texts. As such, domain-agnostic model question answering 232 is able to answer questions related to other general-knowledge texts. However, domain-agnostic question answering model 232 is unable to accurately answer questions related to specific domains.

In contrast to domain-agnostic question answering model 232, domain-specific question answering model 234 is trained using a domain-specific dataset, such as domain-specific dataset 226. Since domain-specific question answering model 234 is trained based on domain-specific data, domain-specific question answering model 234 is able to analyze texts from the same domain as the domain-specific dataset 226 and input text 210 and provide more accurate answers to questions regarding the texts, compared to domain-agnostic question answering model 232. In some embodiments, domain-specific question answering model 234 is trained to receive a set of text and a question as input, and generate output indicating a location within the set of text of an answer to the question. In some embodiments, domain-specific question answering model 234 is trained to receive a set of text and a question as input, and generate output indicating an answer to the question.

In operation, model generation module 230 receives the domain-specific dataset 226 and generates, based on the domain-specific dataset 226, domain-specific question answering model 234. In some embodiments, model generation module 230 generates the domain-specific question answering model 234 by retraining and/or fine-tuning a pre-existing question answering model, such as domain-agnostic question answering model 232, using domain-specific dataset 226. In some embodiments, model generation module 230 generates the domain-specific question answering model 234 by training a new question answering model using domain-specific dataset 226. Model generation module 230 may perform any technically feasible type of training and/or fine-tuning operation, including backpropagation, gradient descent, hyperparameter tuning, teacher forcing, and so forth.

In some embodiments, domain-specific question answering model 234 is trained to receive a set of text and a question as input, and generate output indicating a location within the set of text of an answer to the question. Model generation engine 120 provides the plurality of questions, the plurality of answers, and the context data of domain-specific dataset 226 as training input, and the indices of the plurality of answers as training output, to model generation module 230.

In some embodiments, domain-specific question answering model 234 is trained to receive a set of text and a question as input, and generate output indicating an answer to the question. Model generation engine 120 provides the plurality of questions and the context data of domain-specific dataset 226 as training input, and the plurality of answers and the indices of the plurality of answers as training output, to model generation module 230.

In some embodiments, model generation module 230 generates domain-specific question answering module 234 by fine-tuning a pre-trained language model to perform question answering tasks. The pre-trained language model is a machine learning model trained to perform one or more pre-training tasks. For example, one pre-training task may be to predict one or more masked or hidden tokens in a text sequence. Another pre-training task may be to determine if a second sentence correctly succeeds a first sentence. In some embodiments, the pre-trained language model is trained to perform both masked language modeling and next sentence prediction. Model generation module 230 fine-tunes the pre-trained language model using a question-answer dataset, such as domain-specific dataset 226, to produce a question answering model that can perform question answering tasks. Fine-tuning the pre-trained language model includes adjusting or modifying a plurality of model parameters of the pre-trained language model based on the training input and training output extracted from domain-specific dataset 226.

Figure 3:
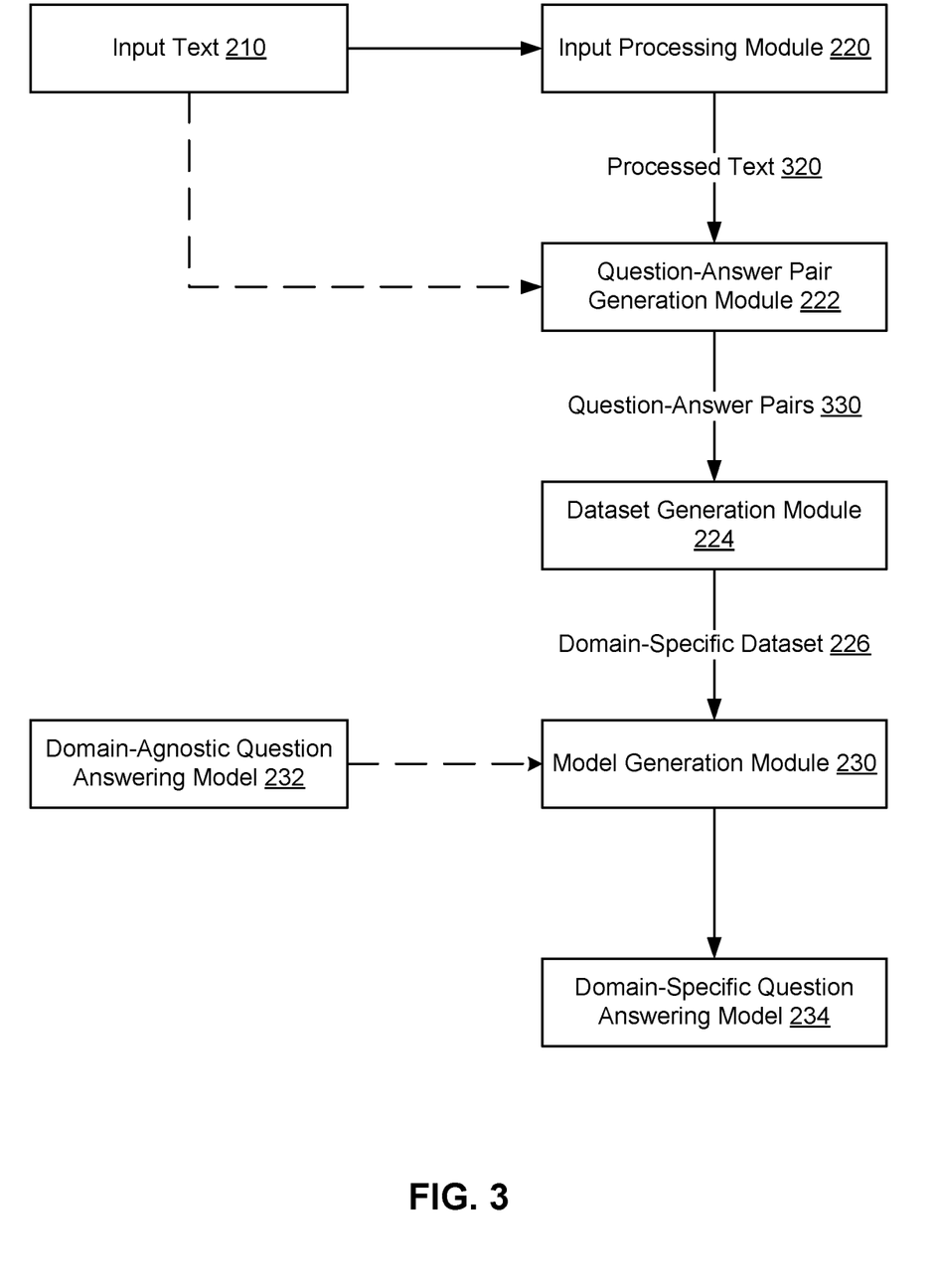
FIG. 3 is an illustration of a domain-specific question answering model generation procedure using a domain-specific dataset, according to various embodiments of the present disclosure.

FIG. 3 is an illustration of a domain-specific question answering model generation procedure using a domain-specific dataset, according to various embodiments of the present disclosure.

As shown in FIG. 3, input text 210 is provided to input processing module 220. Input processing module 220 processes the input text 210 to generate processed text 320.

In some embodiments, input processing module 220 processes the input text 210 by removing unwanted or extraneous characters, phrases, symbols, non-text data, and/or formatting. Processed text 320 comprises the remaining text after the unwanted or extraneous characters, phrases, symbols, non-text data, and/or formatting have been removed.

In some embodiments, input text 210 comprises one or more documents or other files, and input processing module 220 processes the input text 210 by extracting text contained in the one or more documents or other files. Processed text 320 comprises the extracted text.

In some embodiments, input processing module 220 processes the input text 210 by generating a plurality of text segments based on the input text 210. Processed text 320 comprises the plurality of text segments. In some embodiments, input processing module 220 extracts text contained in one or more documents and/or other files and generates the plurality of text segments based on the extracted text. In some embodiments, input processing module 220 removes unwanted or extraneous characters, phrases, symbols, non-text data, and/or formatting from the input text 210 prior to generating the plurality of text segments.

Input processing module 220 provides the processed text 320 to question-answer pair generation module 222. Question-answer pair generation module 222 generates question-answer pairs 330 based on the processed text 320. In some embodiments, input text 210 is provided directly to question-answer pair generation module 222, and question-answer pair generation module 222 generates question-answer pairs 330 based on input text 210.

In some embodiments, question-answer pairs 330 comprises plurality of question-answer pairs, where each question-answer pair includes a question based on the processed text 320 or input text 210 and an answer, from the processed text 320 or input text 210, that answers the question. In some embodiments, question-answer pairs 330 includes one or more question-answer pairs where the corresponding question does not have an answer. The question-answer pairs indicate that no answer to the corresponding question exists in processed text 320 or input text 210.

In some embodiments, question-answer pair generation module 222 generates question-answer pairs 330 by generating a plurality of answers based on the processed text 320 or input text 210. For each answer of the plurality of answers, question-answer pair generation module 222 generates, based on the answer, one or more corresponding questions that could be answered by the answer.

Question-answer pair generation module 222 provides the question-answer pairs 330 to dataset generation module 224. Dataset generation module 224 generates a domain-specific dataset 226 based on the question-answer pairs 330. In some embodiments, the domain-specific dataset 226 comprises the plurality of question-answer pairs, and for each question-answer pair, an index corresponding to the answer in the question-answer pair and context data associated with the answer.

An index indicates a location within the processed text 320 or the input text 210 at which the corresponding answer is located. In some embodiments, generating the domain-specific dataset 226 comprises determining, for each question-answer pair, the location of the corresponding answer within the processed text 320 or input text 210.

Context data associated with an answer comprises portions of the processed text 320 or the input text 210 around the answer. In some embodiments, generating the domain-specific dataset 226 comprises extracting, from processed text 320 or input text 210, one or more tokens preceding the answer in processed text 320 or input text 210 and one or more tokens succeeding the answer in processed text 320 or input text 210. In some embodiments, generating the domain-specific dataset 226 comprises determining a particular text segment of a plurality of text segments comprising processed text 320 that includes the answer. The particular text segment is included as context data for the answer.

In some embodiments, the domain-specific dataset is provided to model generation engine 120 for generating a domain-specific question answering model. In some embodiments, the domain-specific dataset 226 is stored for subsequent use, for example, by a model generation engine executed on a different computing device or by model generation engine 120 at a later time.

The domain-specific dataset 226 is provided to model generation module 230. Model generation module 230 generates a domain-specific question answering model 234 based on the domain-specific dataset 226. In some embodiments, model generation module 230 trains the domain-specific question answering model 234 using the domain-specific dataset 226 as training input and training output. In some embodiments, domain-agnostic question answering model 232 is also provided to model generation module 230. Model generation module 230 generates the domain-specific question answering model 234 based on the domain-specific dataset 226 by retraining and/or fine-tuning the domain-agnostic question answering model 232. In some embodiments, generating domain-specific question answering module 234 comprises fine-tuning a pre-trained language using domain-specific dataset 226.

Figure 4:
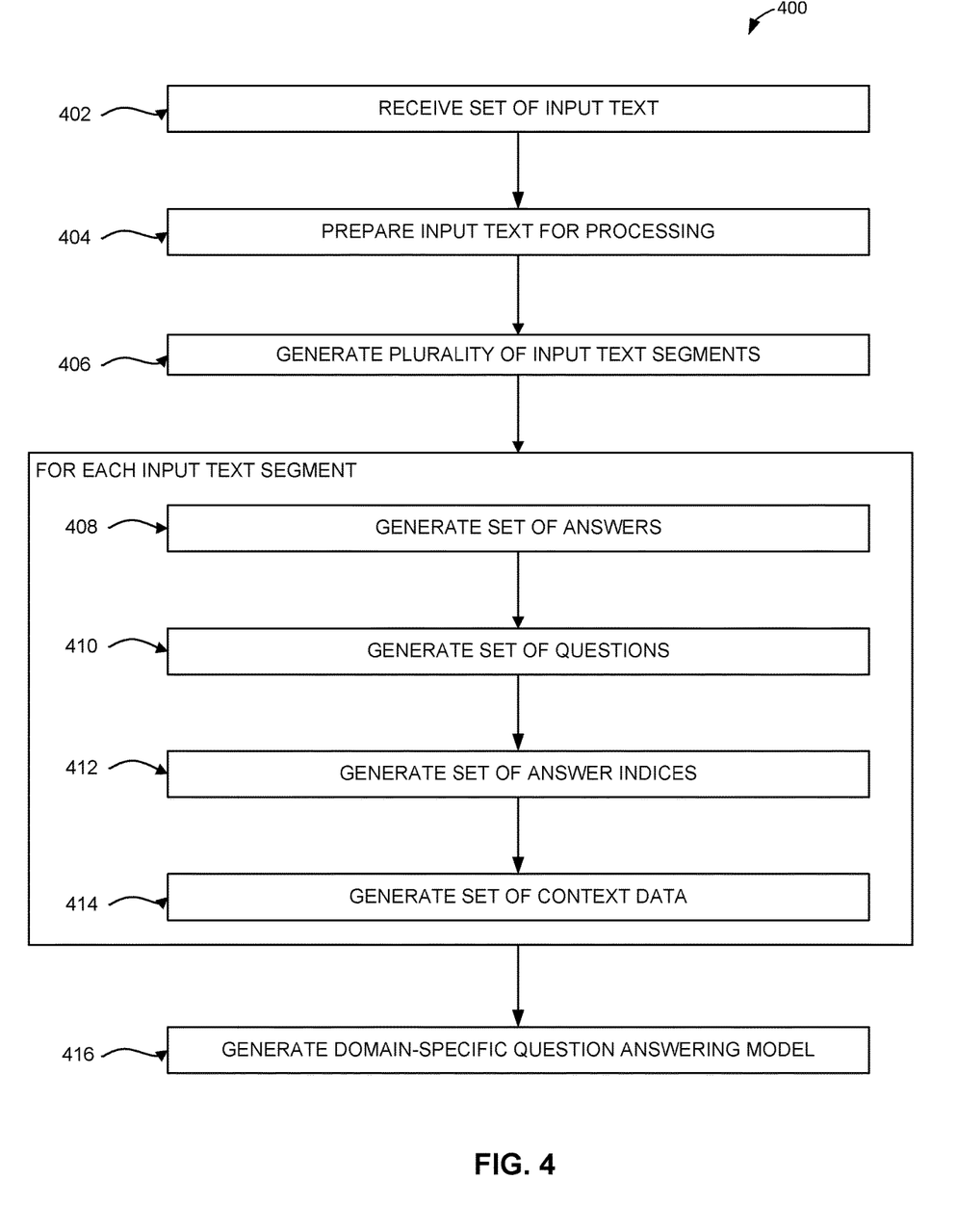
FIG. 4 is a flowchart of method steps for domain-specific question answering model generation, performed by the dataset generation engine and the model generation engine of FIG. 1, according to various embodiments of the present disclosure.

FIG. 4 is a flowchart of a method 400 for domain-specific question answering model generation, performed by the dataset generation engine and the model generation engine of FIG. 1, according to various embodiments of the present disclosure. Although the method steps are described in conjunction with the systems of FIGS. 1 and 2, persons skilled in the art will understand that any system configured to perform the method steps in any order falls within the scope of the present disclosure.

In step 402, input processing module 220 receives input text 210. Input text 210 may be, for example and without limitation, documents or portions thereof, such as articles, journals, white papers, web pages, user-generated or user-provided text, and other texts that are related to a specific domain.

Input text 210 may be received from, for example, a database or other data storage system, another computer system or computing device, from user input such as via a graphical user interface, or other sources of input text. In some embodiments, a user specifies one or more data sources for retrieving input text 210. In some embodiments, a user specifies a specific domain, and based on the specified domain, dataset generation engine 118 identifies one or more data sources corresponding to the specified domain. Dataset generation engine 118 retrieves input text 210 from the one or more identified data sources and provides the retrieved input text 210 to input processing module 220.

In step 404, input processing module 220 prepares the input text 210 for processing. Preparing the input text for processing is performed in a manner similar to that disclosed above with respect to input processing module 220. In some embodiments, input processing module 220 processes the input text 210 by removing unwanted or extraneous characters, phrases, symbols, non-text data, and/or formatting. In some embodiments, input text 210 comprises one or more documents or other files, and input processing module 220 processes the input text 210 by extracting text contained in the one or more documents or other files.

In step 406, input processing module 220 generates a plurality of input text segments. Generating the plurality of input text segments is performed in a manner similar to that disclosed above with respect to input processing module 220.

In some embodiments, generating the plurality of text segments comprises dividing input text 210 into a plurality of non-overlapping segments. Each segment includes a different set of tokens and/or sentences from input text 210. In some embodiments, generating the plurality of text segments comprises dividing input text 210 into a plurality of overlapping segments. Each segment includes at least one of the same token and/or sentence from input text 210 as a previously generated segment and at least one of the same token and/or sentence from input text 210 as a subsequently generated segment.

In some embodiments, input processing module 220 divides input text 210 into segments of equal size. The segment size may be based on an optimal segment size that question-answer pair generation module 222 is configured to utilize. In some embodiments, input processing module 220 determines a size of each segment based on the content of the segment. Input processing module 220 selects a size for each segment such that each segment includes sufficient context surrounding the text included in the segment, such as including entire phrases, sentences, paragraphs, and/or other sets of related text together in the same segment.

In step 408, question-answer pair generation module 222 generates a set of one or more answers based on a text segment of the plurality of input text segments. Generating a set of answers based on a text segment is performed in a manner similar to that disclosed above with respect to question-answer pair generation module 222. In some embodiments, question-answer pair generation module 222 analyzes the text segment to identify one or more portions of the text segment that may be used as an answer to a question. The set of answers comprises the one or more identified portions of the text segment. In some embodiments, generating the set of answers comprises providing the text segment as input to a trained machine learning model and receiving, as output of the trained machine learning model, the set of answers.

In step 410, question-answer pair generation module 222 generates a set of one or more questions based on the text segment of the plurality of input text segments. Generating a set of questions based on a text segment is performed in a manner similar to that disclosed above with respect to question-answer pair generation module 222. In some embodiments, question-answer pair generation module 222 generates, for each answer of the set of answers, one or more questions that could be answered using the answer.

In step 412, dataset generation module 224 generates a set of answer indices based on the text segment of the plurality of input text segments. Generating a set of answer indices is performed in a manner similar to that disclosed above with respect to dataset generation module 224. In some embodiments, generating the set of answer indices comprises determining, for each question-answer pair, a location within the text segment of the answer included in the question-answer pair. In some embodiments, generating the set of answer indices comprises determining, for each question-answer pair, a location within the input text 210 of the answer included in the question-answer pair.

In step 414, dataset generation module 224 generates a set of context data based on the text segment of the plurality of input text segments. Generating a set of context data is performed in a manner similar to that disclosed above with respect to dataset generation module 224. In some embodiments, generating the set of context data comprises, for each answer of the set of answers, extracting one or more tokens preceding the answer in the text segment and one or more tokens succeeding the answer in the text segment. In some embodiments, generating the set of context data comprises generating text data corresponding to the text segment.

The above steps 408-414 are repeated for each input text segment of the plurality of input text segments to generate a domain-specific dataset, such as domain-specific dataset 226, comprising a plurality of answers, a plurality of questions corresponding to the plurality of answers, a plurality of answer indices corresponding to the plurality of answers, and a set of context data associated with the plurality of answers.

In step 416, model generation module 230 generates a domain-specific question answering model based on the domain-specific dataset 226. Generating the domain-specific question answering model is performed in a manner similar to that disclosed above with respect to model generation module 230. In some embodiments, model generation module 230 generates a domain-specific question answering model 234 by training a question answering model using the domain-specific dataset 226 as training data. In some embodiments, model generation module 230 generates the domain-specific question answering model 234 by retraining and/or fine-tuning a domain-agnostic question answering model 232 based on the domain-specific dataset 226. In some embodiments, generating domain-specific question answering module 234 comprises fine-tuning a pre-trained language using the domain-specific dataset 226.

In sum, the disclosed techniques provide a computing system that converts input text into a domain-specific question answering model. The computing system receives input text from a specific domain and processes the input text to generate a plurality of question-answer pairs. The computing system generates a training dataset, for training a question answering model, based on the plurality of question-answer pairs. The training dataset is used to train a domain-specific question answering model and/or retrain a domain-agnostic question answering model to answer domain-specific questions.

At least one technical advantage of the disclosed techniques relative to the prior art is that the disclosed computing system processes texts from a specific domain to generate a domain-specific question-answer dataset that enables generation of a domain-specific question answering model. The domain-specific question answering model more accurately answers questions based on texts from the specific domain compared to prior art question answering models. These technical advantages provide one or more technological advancements over prior art approaches.

1. In some embodiments, a computer-implemented method for generating domain-specific question answering models comprises receiving a set of input text corresponding to a particular domain; generating, based on the set of input text, a question-answer dataset corresponding to the particular domain, the question-answer dataset comprising a plurality of question-answer pairs; and causing one or more machine learning algorithms to be applied to the question-answer dataset to generate a question answering model associated with the particular domain.

2. The method of clause 1, further comprising processing the set of input text by removing one or more of: one or more characters, one or more symbols, one or more non-text data, or text formatting.

3. The method of any of clauses 1-2 further comprising processing the set of input text by generating one or more text segments based on the set of input text.

4. The method of any of clauses 1-3 wherein generating the question-answer dataset comprises generating, for each text segment of the one or more text segments, one or more respective question-answer pairs.

5. The method of any of clauses 1-4 wherein generating the question-answer dataset comprises generating, based on the set of input text, a plurality of answers; and for each answer of the plurality of answers, generating one or more questions corresponding to the answer.

6. The method of any of clauses 1-5 wherein the question-answer dataset further comprises a plurality of indices.

7. The method of any of clauses 1-6 wherein generating the question-answer dataset comprises determining, for each question-answer pair of the plurality of question-answer pairs, a location within the set of input text of an answer of the question-answer pair.

8. The method of any of clauses 1-7 wherein the question-answer dataset further comprises context data associated with the plurality of question-answer pairs.

9. The method of any of clauses 1-8 wherein generating the question-answer dataset comprises generating, for each question-answer pair of the plurality of question-answer pairs, context data comprising one or more portions of the set of input text that include an answer of the question-answer pair.

10. In some embodiments, a computer-implemented method for generating domain-specific question answering models comprises receiving a question-answer dataset corresponding to a particular domain, the question-answer dataset comprising a plurality of questions and a plurality of answers; wherein each question of the plurality of questions is based on a set of text from the particular domain; wherein each answer of the plurality of answers is an answer, from the set of text, to a corresponding question from the plurality of questions; training, based on the question-answer dataset, a question answering model corresponding to the particular domain, wherein the question answering model is trained to answer questions directed towards texts from the particular domain.

11. In some embodiments, a non-transitory computer-readable medium storing instructions that, when executed by a processor, cause the processor to perform the steps of receiving a set of input text corresponding to a particular domain; generating, based on the set of input text, a question-answer dataset corresponding to the particular domain, the question-answer dataset comprising a plurality of question-answer pairs; causing one or more machine learning algorithms to be applied to the question-answer dataset to generate a question answering model associated with the particular domain.

12. The non-transitory computer-readable medium of clause 11 wherein the steps further comprise processing the set of input text by removing one or more of: one or more characters, one or more symbols, one or more non-text data, or text formatting.

13. The non-transitory computer-readable medium of any of clauses 11-12 wherein the steps further comprise processing the set of input text by generating one or more text segments based on the set of input text.

14. The non-transitory computer-readable medium of any of clauses 11-13 wherein generating the question-answer dataset comprises generating, for each text segment of the one or more text segments, one or more respective question-answer pairs.

15. The non-transitory computer-readable medium of any of clauses 11-14 wherein generating the question-answer dataset comprises generating, based on the set of input text, a plurality of answers; for each answer of the plurality of answers, generating one or more questions corresponding to the answer.

16. The non-transitory computer-readable medium of any of clauses 11-15 wherein the question-answer dataset further comprises a plurality of indices.

17. The non-transitory computer-readable medium of any of clauses 11-16 wherein generating the question-answer dataset comprises determining, for each question-answer pair of the plurality of question-answer pairs, a location within the set of input text of an answer of the question-answer pair.

18. The non-transitory computer-readable medium of any of clauses 11-17 wherein the question-answer dataset further comprises context data associated with the plurality of question-answer pairs.

19. The non-transitory computer-readable medium of any of clauses 11-18 wherein generating the question-answer dataset comprises generating, for each question-answer pair of the plurality of question-answer pairs, context data comprising one or more portions of the set of input text that include an answer of the question-answer pair.

20. The non-transitory computer-readable medium of any of clauses 11-19 wherein causing one or more machine learning algorithms to be applied to the question-answer dataset to generate a question answering model associated with the particular domain comprises training the question answering model based on the question-answer dataset.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating domain-specific question answering models, the method comprising:
receiving a set of input text corresponding to a particular domain;
generating, based on the set of input text, a question-answer dataset corresponding to the particular domain, the question-answer dataset comprising a plurality of question-answer pairs and one or more portions of the set of input text surrounding a plurality of answers included in the plurality of question-answer pairs; and
causing one or more machine learning algorithms to be applied to the question-answer dataset to retrain a first question answering model that is domain agnostic to generate a second question answering model that is associated with the particular domain.

2. The method of claim 1, further comprising processing the set of input text by removing one or more of: one or more characters, one or more symbols, one or more non-text data, or text formatting.

3. The method of claim 1, further comprising processing the set of input text by generating one or more text segments based on the set of input text.

4. The method of claim 3, wherein generating the question-answer dataset comprises generating, for each text segment of the one or more text segments, one or more respective question-answer pairs.

5. The method of claim 1, wherein generating the question-answer dataset comprises determining, for each question-answer pair of the plurality of question-answer pairs, a location within the set of input text of an answer of the question-answer pair.

6. The method of claim 1, wherein generating the question-answer dataset comprises generating, for each question-answer pair of the plurality of question-answer pairs, context data comprising one or more portions of the set of input text that include an answer of the question-answer pair.

7. The method of claim 1, wherein the question-answer dataset further comprises a plurality of indices.

8. The method of claim 1, wherein generating the question-answer dataset comprises:
generating the plurality of answers, and
subsequent to generating the plurality of answers, generating one or more questions corresponding to each answer included in the plurality of answers.

9. The method of claim 1, further comprising extracting a plurality of text segments of equal length from the set of input text, wherein the plurality of answers and the one or more portions of the set of input text surrounding the plurality of answers are included in the plurality of text segments.

10. The method of claim 1, wherein the plurality of question-answer pairs includes a first question-answer pair that indicates no answer to a first question is in the set of input text.

11. A computer-implemented method for generating domain-specific question answering models, the method comprising:
receiving a question-answer dataset corresponding to a particular domain, the question-answer dataset comprising a plurality of questions, a plurality of answers, and one or more portions of a set of text surrounding the plurality of answers;
wherein each question of the plurality of questions is based on the set of text from the particular domain;
wherein each answer of the plurality of answers is an answer, from the set of text to a corresponding question from the plurality of questions; and
retraining, based on the question-answer dataset, a first question answering model that is domain agnostic to generate a second question answering model corresponding to the particular domain, wherein the second question answering model is trained to answer questions directed towards texts from the particular domain.

12. A non-transitory computer-readable medium storing instructions that, when executed by a processor, cause the processor to perform the steps of:
receiving a set of input text corresponding to a particular domain;
generating, based on the set of input text, a question-answer dataset corresponding to the particular domain, the question-answer dataset comprising a plurality of question-answer pairs and one or more portions of the set of input text surrounding a plurality of answers included in the plurality of question-answer pairs; and
causing one or more machine learning algorithms to be applied to the question-answer dataset to retrain a first question answering model that is domain agnostic to generate a second question answering model that is associated with the particular domain.

13. The non-transitory computer-readable medium of claim 12, wherein the steps further comprise processing the set of input text by removing one or more of: one or more characters, one or more symbols, one or more non-text data, or text formatting.

14. The non-transitory computer-readable medium of claim 12, wherein the steps further comprise processing the set of input text by generating one or more text segments based on the set of input text.

15. The non-transitory computer-readable medium of claim 14, wherein generating the question-answer dataset comprises generating, for each text segment of the one or more text segments, one or more respective question-answer pairs.

16. The non-transitory computer-readable medium of claim 12, wherein generating the question-answer dataset comprises determining, for each question-answer pair of the plurality of question-answer pairs, a location within the set of input text of an answer of the question-answer pair.

17. The non-transitory computer-readable medium of claim 12, wherein generating the question-answer dataset comprises generating, for each question-answer pair of the plurality of question-answer pairs, context data comprising one or more portions of the set of input text that include an answer of the question-answer pair.

18. The non-transitory computer-readable medium of claim 12, wherein causing one or more machine learning algorithms to be applied to the question-answer dataset comprises retraining the first question answering model based on the question-answer dataset.

* * * * *